M. E. RICE.
FEED BAG SUPPORTER.
APPLICATION FILED APR. 19, 1917.
1,272,102.
Patented July 9, 1918.
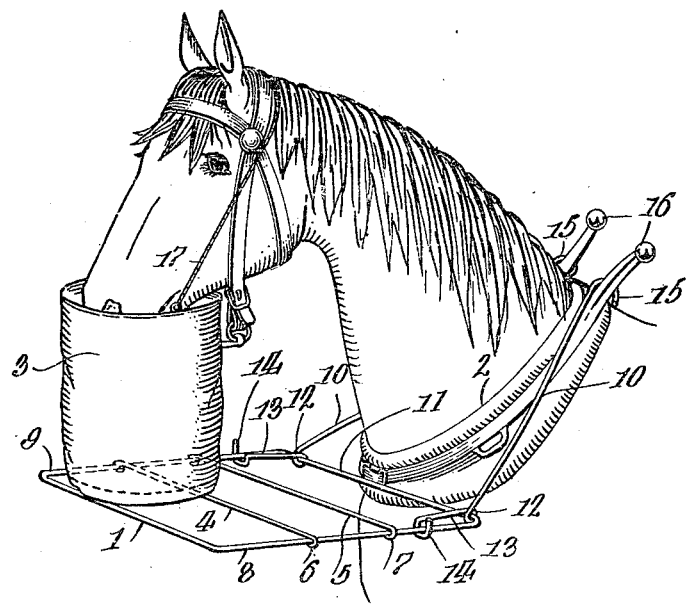
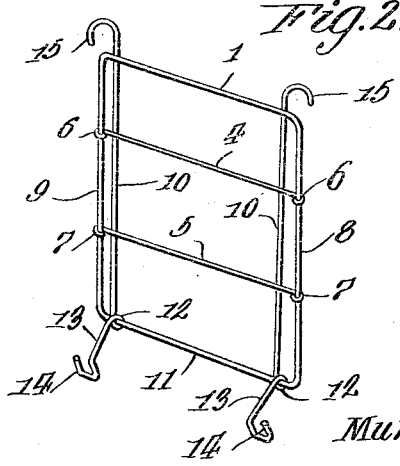
WITNESSES
Guy M. Spring
Frank D. O'Connell
INVENTOR
Murry E. Rice
BY Richard Owen.
ATTORNEY

UNITED STATES PATENT OFFICE.

MURRY E. RICE, OF DELPHOS, KANSAS.

FEED-BAG SUPPORTER.

1,272,102.　　　　　Specification of Letters Patent.　　Patented July 9, 1918.

Application filed April 19, 1917. Serial No. 163,207.

*To all whom it may concern:*

Be it known that I, MURRY E. RICE, a citizen of the United States, residing at Delphos, in the county of Ottawa and State of Kansas, have invented certain new and useful Improvements in Feed-Bag Supporters, of which the following is a specification.

This invention has reference to feed bag supporters and contemplates the provision of means whereby the feed bag may be supported in proximity to the head of the animal so that it may readily reach the contents of the bag.

A further object of the invention is to provide a device of this character which may be readily attached to the horse's collar and which will permit the animal to reach his feed without resorting to the wasteful method of tossing the bag about in order to reach the grain at the bottom end thereof.

A still further object of the invention is to provide a supporting frame for this character which can be readily set in horizontal position for supporting the grain bag thereon, and which is collapsible in nature so that it can be folded up and put away when not required.

With these and other objects in view, my invention consists in the novel details of construction, arrangement and combination of parts as will be hereinafter more fully referred to and described in the following specification and pointed out in the drawings, wherein:—

Figure 1 is a perspective, illustrating the application of the invention, and

Fig. 2 is a detail view of the supporter, in folded condition.

This support may be constructed of any suitable and inexpensive material, preferably steel wire, and comprises a rectangular frame 1 adapted to be supported transversely of the lower end of the collar 2 and in a horizontal plane, thus being in proximity to the horse's head so that the feed bag 3 may be conveniently supported thereon while the animal eats therefrom. Extending transversely of the frame, in spaced relation, are cross pieces 4 and 5 respectively, having their opposite ends bent as indicated at 6 and 7 to engage the side bar 8 and 9 respectively of the frame. Any suitable number of rods 4 and 5 may be secured in this manner to the frame, according to the size of the frame desired or the circumference of the feed bag which the frame is designed to support, it being readily apparent that the purpose of such rods is to support the lower end of the feed bag without permitting the latter to slip through the frame.

A pair of supporting rods 10 are looped at 12 near their front ends about the inner end bar 11 of the frame. The short front arm 13 of each supporting rod is continued forwardly from the loop 12 and spaced inwardly from the adjacent side bar of the frame, as the case may be, terminating in an outturned hook 14 disposed below the plane of the rod 13 and opening laterally of the arm on the side adjacent the nearest side bar of the frame. The major portions of the rods 10 project rearwardly from the loop portion 12 and are provided with hook members 15 adapted to engage over the hame ends 16. It will be noted that the major portions of the supporting rods 10 extend at an obtuse angle to the arms 13 thereof so that when the ends 15 are hooked over the hame ends 16, the arms 13 will lie in a plane substantially parallel to the side frame bars 8 and 9 respectively. The arms 13 when so positioned have their hooked ends 14 engaged under and supporting the side bars 8 and 9 of the frame, whereby the latter is maintained in a horizontal position for supporting a bag 3 as clearly shown in the drawings.

From this it will be seen that the weight of the feed bag is deposited directly upon the supporting frame so that the animal's head is thereby relieved of the strain ordinarily placed thereon by suspending the bag by means of the strap or cord 17. The bag is also supported in such proximity to the head of the animal that access can be had to all parts of the bag, thereby removing the necessity, on the part of the animal, of tossing its head about for the purpose of reaching grain which ordinarily rests upon the bottom of the bag, out of reach of the animal and which act causes the wasteful scattering of the grain from the bag.

In the drawings I have shown the feed bag 3 as supported by a cord passing over the animal's head, but this is simply for the purpose of preventing him from knocking the feed bag off the support, and it will be noticed that the cord is so loose that he must put his nose down into the bag to get at the feed and at that time the support will come into use. A striking feature of my invention, however, lies in the fact that the loops 12 are slidable on the inner end bar 11 of the frame or support. If now it is desired to throw this support out of active position and remove the nose bag, the operator has but to lift the same and disengage the side bars from the hooks 14, then slide the loops 12 inward slightly on the rear bar 11 and drop the entire frame to an upright position, without necessarily taking the hooks 15 or other fastening means off the hames or collar or other part of the harness to which they are attached. Subsequently when the supporter is again to be brought into use, it is lifted and the hooks 14 reëngaged with the side bars, and the nose bag applied. The sliding of the loops 12 on the frame bar 11 is also of use when the entire support is to be folded into small compass for storage, because at this time the two rods 10 can be slipped inward so far that the hooks 15 at their rear ends do not project beyond the side bars 8 and 9. Finally, I consider the use of loops 12 superior to bolts or pivots which would connect the supporting rods with the frame, and which of course might become loose, and under whose heads and nuts the mane is likely to become caught.

Having thus described my invention what I claim as new and desire to secure by Letters Patent is:—

In a feed bag supporter, the combination with a substantially rectangular frame composed of rods, and a plurality of cross rods within the frame; of a pair of supporting rods whereof each has means at its upper end for attachment to a harness-collar and is formed at its lower end into a loop slidably mounted on the rear frame bar, and continued beyond said loop in a short arm standing oblique to the main portion of the rod and having an outturned hook at its front end for removable engagement with the side bar of the frame, for the purpose set forth.

In testimony whereof I affix my signature in presence of two witnesses.

MURRY E. RICE.

Witnesses:
R. B. Ross,
T. S. Smith.

Copies of this patent may be obtained for five cents each, by addressing the "Commissioner of Patents, Washington, D. C."